United States Patent [19]

Briston et al.

[11] 4,085,239
[45] Apr. 18, 1978

[54] PROCESS FOR MANUFACTURING A DIFFERENTIALLY EXPANDED RESINOUS CELLULAR SHEET

[75] Inventors: Rodney John Briston, Blackburn; Rodger George Canning, Chorley; John Parker Tomlinson, Darwen, all of England

[73] Assignee: Reed International Limited, London, England

[21] Appl. No.: 775,883

[22] Filed: Mar. 9, 1977

[30] Foreign Application Priority Data

Mar. 10, 1976 United Kingdom ............... 9557/76

[51] Int. Cl.² .................... B05D 3/02; B05D 5/02
[52] U.S. Cl. ........................ 427/208; 260/2.5 R; 260/2.5 N; 260/2.5 P; 260/2.5 HA; 264/45.5; 264/52; 264/54; 264/DIG. 5; 264/DIG. 15; 264/DIG. 82; 427/210; 427/244; 427/264; 427/276; 427/307; 427/373; 427/380
[58] Field of Search ............... 427/243, 373, 244, 264, 427/276, 208, 210, 307, 380; 264/52, DIG. 5, DIG. 82; 260/2.5 P, 2.5 R

[56] References Cited

U.S. PATENT DOCUMENTS 2,825,282 3/1958 Gergen et al. ............... 264/52 X
3,819,783 6/1974 Jones ............................ 264/52

FOREIGN PATENT DOCUMENTS 1,458,297 1976 United Kingdom ........... 427/244 X

*Primary Examiner*—Ronald H. Smith
*Assistant Examiner*—Evan K. Lawrence
*Attorney, Agent, or Firm*—Bacon & Thomas

[57] ABSTRACT

A process for the manufacture of a differentially expanded sheet material comprises applying an organic solvent to the surface of an expandable thermoplastic sheet containing a blowing agent and allowing the treated sheet to at least partially dry before a composition containing a metallic powder and a kicker for the blowing agent is applied to selected areas of the treated surface. The sheet is then uniformly heated to a temperature at which the blowing agent in contact with the kicker decomposes but below that at which it decomposes in the absence of the kicker, so that the areas of the sheet in contact with the kicker expand to a greater extent than the uncontacted areas.

11 Claims, 5 Drawing Figures

PROCESS FOR MANUFACTURING A DIFFERENTIALLY EXPANDED RESINOUS CELLULAR SHEET

BACKGROUND OF THE INVENTION

1. Field of the Invention

This invention is concerned with improvements in the manufacture of sheet materials having a relief effect wherein the relief is formed by selective decomposition of a blowing agent incorporated in the sheet.

2. Description of the Prior Art

In British Pat. No. 1,458,297 there is described and claimed a process for the preparation of a differentially expanded sheet material which comprises (a) applying an organic solvent to the surface of an expandable thermoplastic sheet containing a blowing agent and allowing the treated sheet to at least partially dry, (b) applying a composition comprising an ink and a kicker for the blowing agent to selected areas of the treated surface and (c) heating the sheet to a temperature at which the blowing agent in contact with kicker decomposes and retaining the sheet at this temperature for a suitable time so that those areas of the sheet in contact with the kicker are expanded to a greater extent than those areas not in contact with the kicker.

Kickers are well known in the art and their effect is to lower the decomposition temperature of certain blowing agents. If a kicker is in association with the blowing agent in certain areas only of the sheet, depression of the decomposition temperature of the blowing agent is obtained in only those areas. Hence a greater degree of expansion of those areas of the sheet containing kicker will be obtained than those areas not containing kicker when the sheet is heated to the depressed decomposition temperature for a given period of time.

Differential expansion of an expandable thermoplastic sheet material containing a blowing agent may be obtained by applying a kicker to certain areas only of the surface of the sheet before heating the sheet to achieve expansion. Application of a kicker to the surface of the sheet possesses attractive advantages however it was found that, when the kicker is applied together with an ink to the surface of an expandable thermoplastic sheet the adhesion of the ink to the thermoplastic sheet is inadequate during subsequent treatment of the sheet. In particular, when multi-colour printing is employed, ink from one printing station has a tendency to pick-off at a subsequent printing station or onto a path roller.

A significant improvement in the adhesion of the ink is obtained when, as described in British Pat. No. 1,458,297, an organic solvent possessing an affinity for the thermoplastic material is applied to the surface of the sheet before applying the kicker. The organic solvent is preferably applied in combination with a resinous binder as a lacquer in which case it will form at least part of the solvent phase. The advantage of applying a lacquer is that, with one coating, the thermoplastic sheet may be treated with the organic solvent and with one or more additional agents present in the lacquer such as a silica or silicate matting agent.

SUMMARY OF THE INVENTION

We have now found that the quantity of kicker required to give the desired degree of expansion to the thermoplastic sheet may be reduced in certain circumstances. The printing of metallic inks onto a sheet material intended for decorative purposes can yield a visually pleasing appearance and the application of such inks to expandable thermoplastic sheets has been investigated. Surprisingly however, we have discovered that when such inks are applied to those areas of the sheet that receive an application of kicker the sheet can be expanded in those areas to an extent greater than would have been expected.

According to one feature of the present invention therefore there is provided a process for the preparation of a differentially expanded sheet material which comprises (a) applying an organic solvent to the surface of an expandable thermoplastic sheet containing a blowing agent and allowing the treated sheet to at least partially dry, (b) applying a composition containing a metallic powder and a kicker for the blowing agent to selected areas of the treated surface and then (c) uniformly heating the sheet to a temperature at which the blowing agent in contact with the kicker decomposes but below that at which it decomposes in the absence of the kicker; and retaining the sheet at this temperature for a suitable time so that those areas of the sheet in contact with the kicker are expanded to a greater extent than those areas not in contact with the kicker.

The desired degree of expansion of the sheet is achieved with a reduced amount of kicker in those areas that are printed with a metallic ink. The effect is particularly unexpected in view of the fact that we have not observed that a metallic ink causes any significant reduction in the decomposition temperature of the blowing agent. We have seen the effect when using only those amounts of metallic ink required to confer the desired decorative appearance. Thus one achieves the significant economic advantage of being able to obtain expansion with a reduced amount of kicker when the metallic ink is merely being used in those amounts normally chosen to impart upon the sheet material the desired visual effect.

We have tended to concentrate on using inks containing those grades of metallic powder hitherto employed in the production of metallic effects. Although metallic powders are available in varying degrees of coarse and fine particle sizes, the former materials are commonly used to achieve the traditional metallic finish with sheet materials. One may use inks containing fine particle size metallic powders although the results may not be so good.

Satisfactory expansion through the full depth of the sheet is dependent upon migration of the kicker through the depth of the sheet. Hence, it has particularly surprised us that a component which tends not to migrate into the full depth of the sheet should, nevertheless, enhance to an unexpected degree the extent of expansion of the full depth of the thermoplastic layer.

DESCRIPTION OF THE PREFERRED EMBODIMENTS

Figure 1:
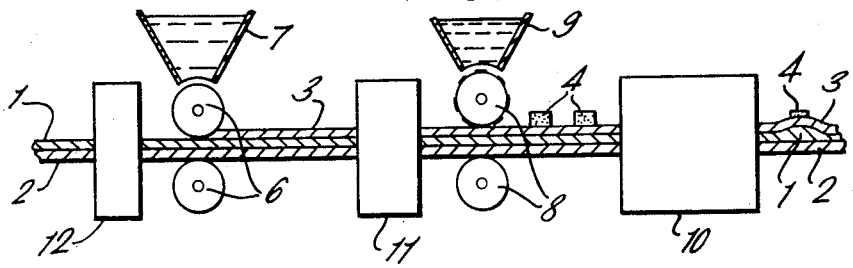
FIG. 1 illustrates one method of producing a sheet material according to the invention on-line.

It should be understood that FIGS. 1–5 are purely diagrammatic and no attempt is made therein to show the relative thicknesses of the various layers that compose the sheet material.

By reason of their availability we particularly prefer to use, as the metallic powder, aluminum powders and a range of finishes may be obtained by selection of an appropriate powder. The advantages that we have achieved are however not confined to aluminium powders and copper, tin and bronze powders may also be used to obtain the enhanced extent of expansion referred to above.

Since the advantage of a saving in the amount of necessary kicker is obtained only in those areas that receive an application of metallic ink it is, in general, convenient to apply the kicker and metallic powder together. One may thus formulate a composition in which the metallic powder is dispersed and then suspend or solubilise kicker therein. Such a composition will, typically, include kicker, metallic powder, a binder and an organic solvent. Alternatively the metallic ink may be applied to the solvent treated thermoplastic sheet either before or after application of the kicker and while these techniques may result in a further improvement in the extent of expansion obtained with a given amount of kicker this does not generally offset the convenience of applying kicker and metallic powder in one step.

The improvement in extent of expansion is particularly apparent in the process according to the invention if the heating that is required to effect expansion is carried out shortly after the application of kicker and metallic powder. This is a further advantage of the process according to the invention since a reduction in overall time of production of the finished sheet is possible with consequent savings in storage costs and space. The steps of treating the sheet with a solvent, applying metallic powder and kicker and expanding the sheet may thus be effected in line.

A further enhancement of the extent of expansion may be achieved by subjecting the sheet to accelerated ageing after printing. Thus, for example, the sheet may be heated for a short period of time although, of course, heating must not be effected to a temperature at which decomposition of the blowing agent in the presence of the kicker occurs. Heating to about 100° C for about 30 minutes has, in general, achieved adequate accelerated ageing.

The metallic ink may be formulated for application in the usual way by, for example, stirring the metal powder into a lacquer. In general such a composition will contain from 2–10% preferably 3–7% by weight of metallic powder. Correspondingly the kicker will be ordinarily present in the composition from which it is applied (which may also contain the metallic powder) in amounts of up to 25% by weight, preferably 5 to 20% by weight. In general more kicker, by weight, is applied than metallic powder and we have found that satisfactory results are achieved with about 2 parts by weight of kicker to 1 part by weight of metallic powder.

The process according to the invention is of particular value in the production of wall coverings since the thermoplastic sheet material may be formed as an unsupported sheet or as a coating on paper, a non-woven synthetic fibre web, a spunbonded web or other suitable base. Differential expansion of the thermoplastic material results in the formation of a sheet having a visually attractive appearance which is well suited to decoration of a wall or ceiling. The process according to the invention is however not limited to the production of wall coverings and the sheet materials may also find utility as floor coverings, decorative laminates, display stickers and decalcomania. In the production of floor coverings the thermoplastic sheet will ordinarily be formed on a relatively substantial base which may be a suitable plastics material, a felted sheet, or a woven or knitted fabric formed, for example from natural or synthetic fibres.

In general, in the production of wallcoverings (rather than floor-coverings and the like), one seeks a relatively large degree of expansion of the raised areas of the sheet material with respect to the remainder of the sheet. It is thus necessary to employ relatively large amounts of kicker and such kicker applications are preferably achieved by increasing the ratio of kicker to resin (present in the kicker-containing composition). Thus we prefer a weight ratio of kicker to resin of at least 0.75:1, desirably at least 0.9:1, and, in general, not more than 3:1, advantageously not more than 1.5:1.

It is at these higher kicker to resin ratios (particularly in the range of from 0.9:1 to 3:1) that the problem of ink adhesion discussed above in relation to British Pat. No. 1,458,297 becomes more evident. As a practical measure we therefore consider it essential to employ the step of applying an organic solvent to the surface of the expandable thermoplastic sheet since this step does significantly enhance the adhesion of inks to the expandable sheet.

As stated above, the problem of poor ink adhesion manifests itself at higher kicker to resin ratios. It is the presence of kicker which appears to effect the ink adhesion and it follows that the step of applying an organic solvent to the surface of the expandable thermoplastic sheet to enhance ink adhesion need only be performed on those areas of the sheet that, eventually, receive an application of kicker-containing metallic ink. In general however, from the point of view of efficiency and ease of operation, it will usually be better to apply the solvent to the whole of the surface of the expandable thermoplastic sheet.

The thermoplastic sheet may be formed of any convenient expandable synthetic resinous material. Preferred materials include polymers of vinyl chloride or copolymers of vinyl chloride and anoterh copolymerisable monomer such as vinyl acetate or an acrylic or methacrylic monomer such as an ester of acrylic or methacrylic acid or acrylic or methacrylic acids themselves. The expandable sheet may be formed from a plastisol in which case the thermoplastic polymer or copolymer will be mixed with a blowing agent, a stabiliser, a plasticiser which may be any of the the usual phthalate compounds and pigments or extenders. The stabiliser should be so selected as to have a much lower catalytic action with the blowing agent under the chosen processing conditions than the kicker. The plastisol is formed into a sheet in any convenient manner and may, for example, be applied to a base web of paper or like substance as discussed above, the weight of plastisol being for example, from 40 to 800 g/m$^2$.

While a variety of techniques may be used to apply a plastisol to a base such as paper some techniques are of especial advantage in large scale manufacture. Thus we prefer to apply the plastisol to the base sheet using reverse roll coating. In reverse roll coating a pair of rolls are operated in reverse directions and the plastisol is applied to the base as the latter passes through the nip between the pair of rolls. The plastisol is subjected to very high shear in this application technique and the surface of the plastisol layer produced has a distinctive character.

After the plastisol has been applied we prefer to gel and consolidate the resulting surface. Consolidation is effected by passing the gelled plastisol through the nip of a pair of sand blasted rolls. Sand blasted rolls have a uniform, slightly rough surface and the consolidation process produces a distinctive character on the surface of the gelled plastisol layer.

The precise choice of blowing agent will depend upon the particular thermoplastic material employed and, its decomposition temperature in the presence of the kicker should be appropriate to the thermoplastic material. Blowing agents are well known and have been described in the literature. Suitable blowing agents include azobis-formamide and azobis-isobutyronitrile. The blowing agent may conveniently be present in the thermoplastic sheet in amounts of up to 15%, e.g. 1 to 15%, preferably from 3 to 9%, by weight based on the weight of the expandable, synthetic resinous material.

An alternative technique for use in the production of the expandable thermoplastic sheet is hot melt coating. This technique may be applied to a wide range of materials such as polyethylene, polyvinyl chloride, polyester and acrylic polymers.

Application of the solvent may be made in any convenient manner as described fully in British Pat. No. 1,458,297. Since the function of the solvent appears to be, at least in part, to etch the surface of the sheet the solvent should be chosen according to the character of the thermoplastic material. Thus, in the case of expandable thermoplastic sheets based upon polymers of vinyl chloride or copolymers of vinyl chloride and another copolymerisable monomer, we prefer that the organic solvent should be polar since such solvents usually possess a greater affinity for the thermoplastic material than do non-polar solvents.

Suitable solvents for application to the thermoplastic sheet include hydroxylic compounds for example mono- and polyhydric alcohols; aliphatic and alicyclic ethers such as tetrahydrofuran; esters such as ethylacetate or isopropyl acetate; glycol ethers; glycol esters such as 2-ethoxyethyl acetate; aliphatic and alicyclic ketones such as methyl ethyl ketone, methyl isobutylketone or cyclohexanone; halogenated hydrocarbons in particular chlorinated aliphatic hydrocarbons; nitro compounds such as nitro propane or nitrobenzene; and Lewis bases such as substituted amides for example dimethylformamide and dimethylacetamide and di(-loweralkyl)sulphoxides for example dimethylsulphoxides.

There may be advantages associated with the use of strongly polar solvents in certain cases and, in such cases it may be desirable to use the chosen solvent in conjunction with a less polar or non-polar solvent. The latter material serves as a diluent for the polar solvent and may conveniently be a hydrocarbon such as toluene, xylene or methylated spirits.

In the particular case of thermoplastic sheets formed of vinyl chloride homopolymers and copolymers we have found aliphatic ketones such as methyl ethyl ketone and aromatic hydrocarbons such as toluene or xylene to be advantageous solvents to use.

The rate application of the chosen solvent to the expandable thermoplastic sheet will depend upon the method of application used. In general a rate of application of from 10 to 700 g/sq.m, preferably 30 to 500 g/sq.m, will yield satisfactory results. In the particular case of application of the solvent by gravure printing the rate of application may be from 25 to 300 g/sq.m, preferably from 50 to 150 g/sq.m.

As stated above the chosen solvent may be applied as the solvent phase of a lacquer. The use of a lacquer is a convenient way of treating the surface of the thermoplastic material with an additional component such as a matting agent or pigment. The heat treatment in the expansion step may produce a glossy surface on the resulting sheet and it may be desirable to introduce a matting agent to reduce this effect. The lacquer may contain, as binder, any suitable resin such as a polymer or copolymer of ethylenically unsaturated monomers for example vinyl and/or acrylic or methacrylic monomers. Other suitable binders for the lacquer include polyurethanes, polyesters and epoxy resins. The lacquer may be applied by any of the well-known techniques such as gravure, roller coating, screen printing or flexographic printing and since these methods may also be used to apply compositions containing a kicker and a metallic powder the whole technique readily lends itself to an in-line industrial operation.

We particularly prefer to employ gravure rollers in the application of a lacquer to the surface of the thermoplastic sheet. The gravure rollers will preferably be engraved with 80 to 200 lines per linear inch.

The kicker will ordinarily be a compound of zinc, cadmium or lead and conveniently the kicker will be a salt of zinc, cadmium or lead although other compounds of the chosen metals may be employed such as, for example, zinc oxide. Zinc, cadmium or lead salts may be formed of inorganic or organic acids. Inorganic acids which may be used in salt formation include hydrochloric and nitric acids whilst suitable organic acids include carbonic, oxalic, acetic, lactic, citric, formic, sebacic, octanoic, stearic, phthalic and benzoic acids. The preferred kickers are the salts of octanoic acid and a particularly convenient kicker to employ is zinc octoate.

The solvent for the metallic ink may be any of the usual solvents for such inks employed in the production of printed wall coverings. Thus, for example, ketones such as methyl ethyl ketone; esters such as 2-ethoxyethyl acetate; nitro compounds such as nitropropane and hydrocarbons such as toluene may all be used with advantage.

Formulation of the kicker and metallic powder composition(s) will depend upon the precise manner of printing onto the treated sheet material chosen. The composition(s) may however be applied with equal advantage in printing using any of the conventional techniques such as those listed above for application of the lacquer.

As mentioned above the expandable thermoplastic sheet is preferably formed from a plastisol and in the case of such sheet materials the degree of gelation of the expandable sheet materials at the time of application of the organic solvent and the kicker is important. Thus, if the degree of gelation is too low the surface character of the sheet will be destroyed during the application of the solvent, especially if such application involves passage of the sheet through the nip of printing rollers. Conversely, if the degree of gelation is too great it will be difficult to obtain satisfactory expansion of the sheet. Satisfactory gelation of the sheet may be achieved by heating it to 110°–140° C for a relatively short period of time. A few minutes heating at low temperatures is generally sufficient while heating for less than a minute may be adequate at higher temperatures.

Expansion of the printed thermoplastic sheet may take place as an in-line operation after the printing steps. Alternatively the printed sheets may be stacked as sheets or wound on to a reel and expanded subsequently. In this latter case there may be a tendency for kicker from one sheet to migrate into adjacent stacked or wound sheets causing undesired expansion in areas of those adjacent sheets.

The thermoplastic sheet may be provided with a coating which is impervious to the kicker after the printing step in order to avoid this problem and the impervious layer may be applied either to the back or to the front of the sheet before it is stacked or reeled. The layer is preferably applied as a transparent lacquer to the top face of the printed sheet after the final printing step. Application of the impervious layer to the top face is preferred because, in addition to providing the barrier to migration of the kicker, such a coating may serve as a wear layer to protect the sheet in use.

If desired the sheet material obtained by the process according to the invention may be presented with a coating of adhesive on the side for application to the substrate. For example, in the particular case of wall coverings the side of the sheet material to be applied to the wall or ceiling may be provided with a coating of a water-activatable adhesive. The adhesive coating may be provided at any convenient point in the manufacture of the sheet material.

In the case of water-activatable adhesives the coating may be applied as an aqueous solution, dispersion or emulsion to the surface of the sheet and dried. Adhesive may be applied at the rate of 2 to 30 grams/square meter of surface area and the adhesive may be a natural or synthetic resinous material, a vegetable gum, a soluble starch or starch ether or other suitable material.

It may be preferably to incorporate into the adhesive coating other ingredients such as for example surface active agents to improve the water-absorption properties of the adhesive coating and fungicides to inhibit mould growth.

The process according to the invention may be used in the preparation of sheet materials having the most variegated effects. Thus, for example, two or more applications of a kicker composition may be made to different areas of the surface of the sheet after the treatment with a solvent. Conventional pigments may be employed in addition to the metallic ink in the different kicker compositions which, moreover, may contain differing concentrations of kicker. After expansion of such a sheet, a product is formed in which a variety of degrees of expansion have been obtained giving a product having a pleasing decorative effect.

In order that the invention may be well understood the production of a sheet material according to one preferred mode of operation according to the invention will be described by way of illustration only with reference to the accompanying drawings.

Figure 2:
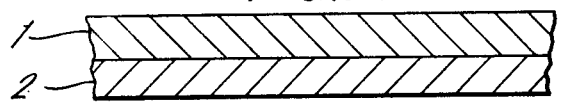
FIG. 2 is an enlarged partial longitudinal section of an expandable thermoplastic sheet.
Figure 3:
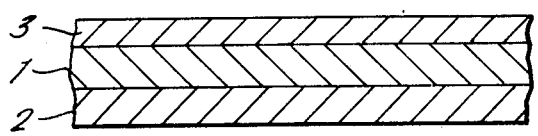
FIG. 3 is a section of the sheet shown in FIG. 2 carrying a coating of a lacquer.

An expandable thermoplastic layer 1 is applied as a plastisol to a sheet of suitable paper 2 and partially gelled by the oven 12 to produce a sheet material as shown in FIG. 2. The sheet material so formed is presented to the nip between a pair of rolls 6 as shown in FIG. 1 and receives a coating of a lacquer 3 from a bath 7 whereafter it is partially dried by oven 11 to produce a lacquered sheet as shown in FIG. 3. The lacquer contains a dispersion of matting agent in a solution of a vinyl chloride homo- or copolymer in an organic solvent possessing an affinity for the thermoplastic sheet. A suitable lacquer is described more fully in Example 1 below.

The lacquered sheet then proceeds to the nip between a pair of conventional printing rolls 8 and ink from bath 9 is applied to certain areas only of the lacquered surface of the sheet. The ink contains aluminium powder and a kicker appropriate to the blowing agent present in the thermoplastic layer 1 and formulations for such inks are described more fully in Example 1 below. The sheet material is then of an appearance as shown in FIG. 4 and has a number of discreet areas 4 coated with kicker-containing ink.

Figure 4:
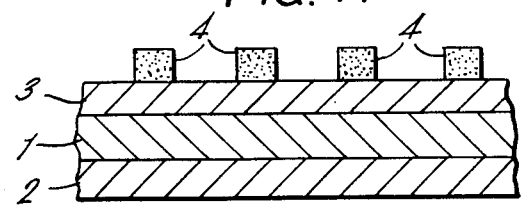
FIG. 4 is a section of the sheet shown in FIG. 3 after application of an ink to the treated surface.
Figure 5:
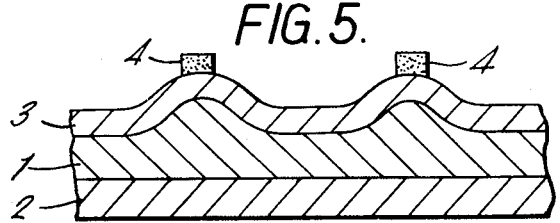
FIG. 5 is a section of the sheet shown in FIG. 4 after expansion.

The printed sheet shown in FIG. 4 then passes on to an oven 10 wherein the sheet attains a temperature intermediate between the decomposition temperature of the blowing agent and a mixture of the blowing agent and the kicker. Differential expansion is thereby obtained to form a product, as shown in FIG. 5, in which those portions of the sheet that received an application of kicker-containing ink are expanded to a greater extent than those portions of the sheet which received no such coating. The resulting sheet material is visually attractive and may be used as a wall covering.

In order that the invention may be further understood the following examples are given by way of illustration only. In the examples parts referred to are parts by weight.

EXAMPLE 1

(a) Preparation of expandable thermoplastic sheet

| | |
|---|---|
| Polyvinyl chloride | 100 parts |
| Dicapryl phthalate (plasticizer) | 65 parts |
| Organo-tin stabiliser | 1 part |
| Epoxidised oil stabiliser | 6 parts |
| Azobis-formamide | 6 parts |
| Titanium dioxide | 40 parts |
| White spirit | 5 parts | was applied by means of a doctor blade at a thickness of 0.2 mm and a dried weight of 190 gm/M$^2$ on to 90 gm/m$^2$ Paper. The coating was gelled at a temperature of 120–130° C for 60 seconds to yield an expandable thermoplastic sheet (b) Treatment of expandable sheet with solvent A lacquer was prepared by dispersing the following formulation:

| | |
|---|---|
| Vinyl chloride/vinyl acetate copolymer | 18 parts |
| Silica matting agent | 8 parts |
| Methyl ethyl ketone | 40 parts |
| Xylene | 10 parts |
| Toluene | 24 parts |

The viscosity of the lacquer was adjusted by addition of methyl ethyl ketone to 30 seconds (as measured on Ford No. 4 cup) and the lacquer was then applied to the surface of the gelled polyvinyl chloride sheet prepared in (a) using a gravure roller engraved with 140 lines per linear inch.

(c) Printing

After partial drying the following ink composition was applied to the treated sheet:

| | |
|---|---|
| Vinyl chloride polymer in methyl ethyl ketone | 25 parts |
| 2-Ethoxyethylacetate | 5 parts |
| Methylethylketone | 28 parts |
| Toluene | 12 parts |
| Zinc Octoate | 20 parts |
| Aluminum powder (superfine grade) | 6 parts |

If necessary the viscosity of the ink was adjusted to 30 seconds (as measured on Ford No. 4 Cup) by addition of methyl ethyl ketone. The ink was applied in a chosen pattern using a gravure roller engraved with 120 lines per linear inch and blown at 200° C for one minute after accelerated ageing at 100° C for 30 minutes.

The product obtained has an expansion in the inked areas of more than 0.014 inches relative to the unprinted areas and a visually attractive appearance enhanced by the sheen of the areas printed with the metallic ink.

As a comparison, a sheet treated with solvent as described above in (b) was partially dried and then the following ink composition was applied thereto:

| | |
|---|---|
| Vinyl chloride polymer in methyl ethyl ketone | 25 parts |
| 2-Ethoxyethylacetate | 5 parts |
| Methyl ethyl ketone | 28 parts |
| Toluene | 12 parts |
| Zinc octoate | 20 parts |
| Pigment | 6 parts |

The ink was applied after any necessary adjustment of viscosity in the manner described above and the sheet was blown after the same accelerated ageing schedule. The product obtained had an expansion in the inked areas of 0.012 inches more than in the unprinted areas. An enhancement of at least 0.002 inches in expansion was thus achieved with the use of an ink containing aluminium powder.

EXAMPLE 2

(a) Preparation of expandable thermoplastic sheet

| | |
|---|---|
| Polyvinyl chloride | 100 parts |
| Dicapryl phthalate (plasticizer) | 60 parts |
| Organo-tin stabiliser | 0.75 part |
| Epoxidised oil stabiliser | 4.5 part |
| Azobis-formamide | 4 parts |
| Titanium dioxide | 20 parts |
| White spirit | 5 parts |
| Filler | 14 parts |
| Viscosity depressant | 1 part | was applied by means of a doctor blade at a thickness of 0.2 mm and a dried weight of 190 gm/m² on to 90 gm/m² Paper. The coating was gelled at a temperature of 120°–130° C for 60 seconds to yield an expandable thermoplastic sheet (b) Treatment of expandable sheet with solvent A lacquer was prepared by dispersing the following formulation:

| | |
|---|---|
| Acrylic resin | 8.5 parts |
| Silica matting agent | 22 parts |
| Methyl ethyl ketone | 42 parts |
| Oxitol acetate | 27.5 parts |

The viscosity of the lacquer was adjusted by addition of methyl ethyl ketone to 30 seconds (as measured on Ford No. 4 cup) and the lacquer was then applied to the surface of the gelled polyvinyl chloride sheet prepared in (a) using a gravure roller engraved with 140 lines per linear inch.

(c) Printing

After partial drying the following ink composition was applied to the treated sheet:

| | |
|---|---|
| Acrylic resin | 11 parts |
| Ethyl acetate | 9 parts |
| Methylethylketone | 38.5 parts |
| Silica matting agent | 14 parts |
| Zinc Octoate | 11 parts |
| Aluminum powder (gravure grade) | 6 parts |
| Oxitol acetate | 16.5 parts |

If necessary the viscosity of the ink was adjusted to 30 seconds (as measured on Ford No. 4 cup) by addition of methyl ethyl ketone. The ink was applied in a chosen pattern using a gravure roller engraved with 120 lines per linear inch and blown at 200° C for one minute after accelerated ageing at 100° C for 30 minutes.

The product obtained has an expansion in the inked areas of more than 0.016 inches relative to the unprinted areas and a visually attractive appearance enhanced by the sheen of the areas printed with the metallic ink.

EXAMPLES 3 and 4

Using the treated sheet prepared as described in Example 2(b) ink composition were applied using a gravure roller. In the ink compositions employed ink formulations were employed analogous to that described in Example 2(c) except that 6 parts of copper powder (Example 3) and 6 parts of bronze powder (Example 4) were substituted for the 6 parts of aluminium powder.

In each case visually attractive products were obtained and in the products the inked areas had expanded 0.014 inches more than the unprinted areas.

We claim:

1. A process for the manufacture of a differentially expanded resinous cellular sheet, comprising applying an organic solvent to the surface of an expandable sheet composed of a thermoplastic resinous composition having a blowing agent incorporated therein, said solvent having an affinity for said resinous composition; allowing the solvent-treated sheet to at least partially dry; applying a composition containing a metallic powder and a kicker for the blowing agent to portions of the solvent-treated surface, adhesion of the metallic powder composition to said sheet being enhanced by the solvent treatment; and then uniformly heating the treated sheet for a time and at a temperature at which the blowing agent decomposes in the presence of the kicker but below that at which it decomposes in the absence of the kicker so that those portions of the sheet which received an application of metallic powder and kicker containing composition expand to a greater extent than those portions which did not receive an application of metallic powder and kicker containing composition to produce said differentially expanded sheet.

2. A process as defined in claim 1 wherein the metallic powder is alumimum powder.

3. A process as defined in claim 1 wherein, after application of the metallic powder and kicker to the surface of the resinous sheet and before said uniform heating to expand the sheet;, the treated sheet is subjected to accelerated ageing by heating at a temperature below that at which there occurs decomposition of the blowing agent in the presence of the kicker.

4. A process as defined in claim 1 wherein the composition applied to said portions of the solvent-treated sheet is an ink which contains a kicker, a metallic powder, a binder and an organic solvent.

5. A process as defined in claim 4 wherein said ink contains about 1 part by weight of metallic powder per 2 parts by weight of kicker.

6. A process as defined in claim 4 wherein the weight ratio of kicker to binder in said ink is from 0.9:1 to 1.5:1.

7. A process as defined in claim 1 wherein the organic solvent is an aliphatic or alicyclic ether, an ester, a glycol ester, an aliphatic or alicyclic ketone or a nitro compound.

8. A process as defined in claim 1 wherein the organic solvent is applied as the solvent phase of a lacquer.

9. A process as defined in claim 8 wherein the lacquer inclues a matting agent.

10. A process as defined in claim 1 wherein the kicker is an octoate of zinc, cadmium or lead.

11. A process as defined in claim 1 wherein the sheet is provided with a coating of adhesive for application to a substrate, said adhesive being coated onto the surface of said sheet opposed to the surface to which the metallic powder and kicker are applied.

* * * * *